United States Patent
Wong (10) Patent No.: US 8,102,168 B1
(45) Date of Patent: Jan. 24, 2012

(54) PSRR REGULATOR WITH UVLO

(75) Inventor: Kern Wai Wong, Sunnyvale, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 647 days.

(21) Appl. No.: 11/871,536

(22) Filed: Oct. 12, 2007

(51) Int. Cl.
*G05F 3/08* (2006.01)

(52) U.S. Cl. .................. 323/314; 323/281; 327/143

(58) Field of Classification Search ............ 323/314, 323/281, 316, 313, 315, 317, 901; 327/143
See application file for complete search history.

(56) References Cited

U.S. PATENT DOCUMENTS

| | | | |
|---|---|---|---|
| 5,198,747 A * | 3/1993 | Haight | 323/303 |
| 6,114,845 A | 9/2000 | Capici et al. | |
| 6,278,320 B1 | 8/2001 | Vu | |
| 6,288,526 B1 * | 9/2001 | Olah | 323/316 |
| 6,498,469 B2 * | 12/2002 | Kobayashi | 323/313 |
| 6,522,114 B1 * | 2/2003 | Bakker et al. | 323/282 |
| 6,542,027 B2 | 4/2003 | Zha et al. | |
| 6,664,825 B2 * | 12/2003 | Ishikawa et al. | 327/142 |
| 6,724,176 B1 | 4/2004 | Wong et al. | |
| 6,750,683 B2 * | 6/2004 | McClure et al. | 327/78 |
| 7,129,686 B1 | 10/2006 | Huang et al. | |

OTHER PUBLICATIONS

The Best of Bob Pease—The Design and Band-Gap Reference Circuits: Trials and Tribulations, http:www.national.com/rap/Application/0,1570,24,00.html, accessed Sep. 12, 2007, 6 pgs.

Tham, Khong-Meng et al., "A Low Supply Voltage Hish PSRR Voltage Reference in CMOS Process," IEEE Journal of Solid-State Circuits, vol. 30, No. 5, May 1995, pp. 586-590.

Chung, Wen-Yaw et al., "A Wide-Range and High PSRR CMOS Voltage Reference for Implantable Device," APCCAS 2006, pp. 482-485.

Du, Xiao et al., "A Curvature-Compensated Bandgap Reference with Improved PSRR," IEEE, 2005, pp. 548-551.

Hui, Shen et al., "A Precise Bandgap Reference with High PSRR," IEEE, 2005, pp. 267-270.

Mehrmanesh, S. et al., "A 1-Volt, High PSRR, CMOS Bandgap Voltage Reference, " IEEE, 2003, pp. I-381-I-384.

Hu, Yamu et al., "A 900mV 25 mW High PSRR CMOS Voltage Reference Dedicated to Implantable Micro-Devices," IEEE, 2003, pp. I-373-I-376.

LP5900, Ultra Low Noise, 150 mA Linear Regulator for RF/Analog Circuits Requires No Bypass Capacitor, National Semiconductor Corporation, Sep. 2007, pp. 1-12.

LP3990, 150mA Linear Voltage Regulator for Digital Applications, National Semiconductor Corporation, Oct. 2005, pp. 1-13.

LP5952, 350mA Dual Rail Linear Regulator, National Semiconductor Corporation, Oct. 2007, pp. 1-16.

(Continued)

*Primary Examiner* — Harry Behm
(74) *Attorney, Agent, or Firm* — Frommer Lawrence & Haug LLP; Matthew M. Gaffney (57) ABSTRACT

The invention relates to a regulator with an under-voltage lock-out (UVLO) circuit and a reference generator circuit (e.g., a band-gap reference). The UVLO circuit includes an internal band-gap reference circuit and a comparison circuit. The UVLO circuit compares an input voltage with the output of the internal band-gap reference circuit to selectively enable the regulator. The output of the internal band-gap reference circuit is also employed to power the reference generator circuit. The reference generator circuit provides a reference signal which is employed to control steady-state regulation. The regulator also includes an operational amplifier circuit for increasing the drive and/or voltage level of the internal band-gap reference circuit output.

16 Claims, 5 Drawing Sheets

OTHER PUBLICATIONS

LP3907, Dual High-Current Step-Down DC/DC and Dual Linear Regulator with 12C Compatible Interface, National Semiconductor Corporation, Aug. 2007, pp. 1-42.

LP3906, Dual High-Current Step-Down DC/DC and Dual Linear Regulator with 12C Compatible Interface, National Semiconductor Corporation, Sep. 2007, pp. 1-40.

LP3971, Power Management Unit for Advanced Application Processors, National Semiconductor Corporation, Nov. 8, 2007, pp. 1-48.

Application and Figures for U.S. Appl. No. 11/871,518, filed on Oct. 12, 2007, 21 pgs.

* cited by examiner

FIG. 5

PSRR REGULATOR WITH UVLO

TECHNICAL FIELD

The invention is generally directed to the area of power regulation. The invention is directed, particularly, but not exclusively to improving the power supply rejection ratio of a regulator.

BACKGROUND

Regulators such as linear regulators and switching regulators are typically employed to provide a substantially constant output voltage or output current over a range of input voltages, input disturbances, output load changes, and/or the like. In particular, the ability of a regulator to provide a constant output in spite of input supply noise is commonly referred to as the power supply rejection ratio (PSRR). It is generally desirable for a regulator to have a high PSRR.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified. These drawings are not necessarily drawn to scale.

For a better understanding of the present invention, reference will be made to the following Detailed Description, which is to be read in association with the accompanying drawings, wherein.

DETAILED DESCRIPTION

Various embodiments of the present invention will be described in detail with reference to the drawings. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" includes plural reference. References in the singular are made merely for clarity of reading and include plural reference unless plural reference is specifically excluded. The meaning of either "in" or "on" includes both "in" and "on." The term "or" is an inclusive "or" operator, and is equivalent to the term "and/or" unless specifically indicated otherwise. The term "based on" or "based upon" is not exclusive and is equivalent to the term "based, at least in part, on" and includes being based on additional factors, some of which are not described herein. The term "coupled" means at least either a direct electrical connection between the items connected, or an indirect connection through one or more passive or active intermediary devices. The term "circuit" means at least either a single component or a multiplicity of components, either active and/or passive, that are coupled together to provide a desired function or functions. The term "signal" means at least one current, voltage, charge, temperature, data, or other signal. A "signal" may be used to communicate using active high, active low, time multiplexed, synchronous, asynchronous, differential, single-ended, or any other digital or analog signaling or modulation techniques. A "signal" may also be employed to provide and/or transmit power. Where either a field effect transistor (FET) or a bipolar transistor may be employed as an embodiment of a transistor, the scope of the words "gate", "drain", and "source" includes "base", "collector", and "emitter", respectively, and vice versa. The phrase "in one embodiment," as used herein does not necessarily refer to the same embodiment, although it may.

Briefly stated, the invention relates to a regulator with an under-voltage lock-out (UVLO) circuit and a reference generator circuit (e.g., a band-gap reference). The UVLO circuit includes an internal band-gap reference circuit and a comparison circuit. The UVLO circuit compares an input voltage with the output of the internal band-gap reference circuit to selectively enable the regulator. The output of the internal band-gap reference circuit is also employed to power the reference generator circuit. The reference generator circuit provides a reference signal which is employed to control steady-state regulation. The regulator also includes an operational amplifier circuit for increasing the drive and/or voltage level of the internal band-gap reference circuit output.

Figure 1:
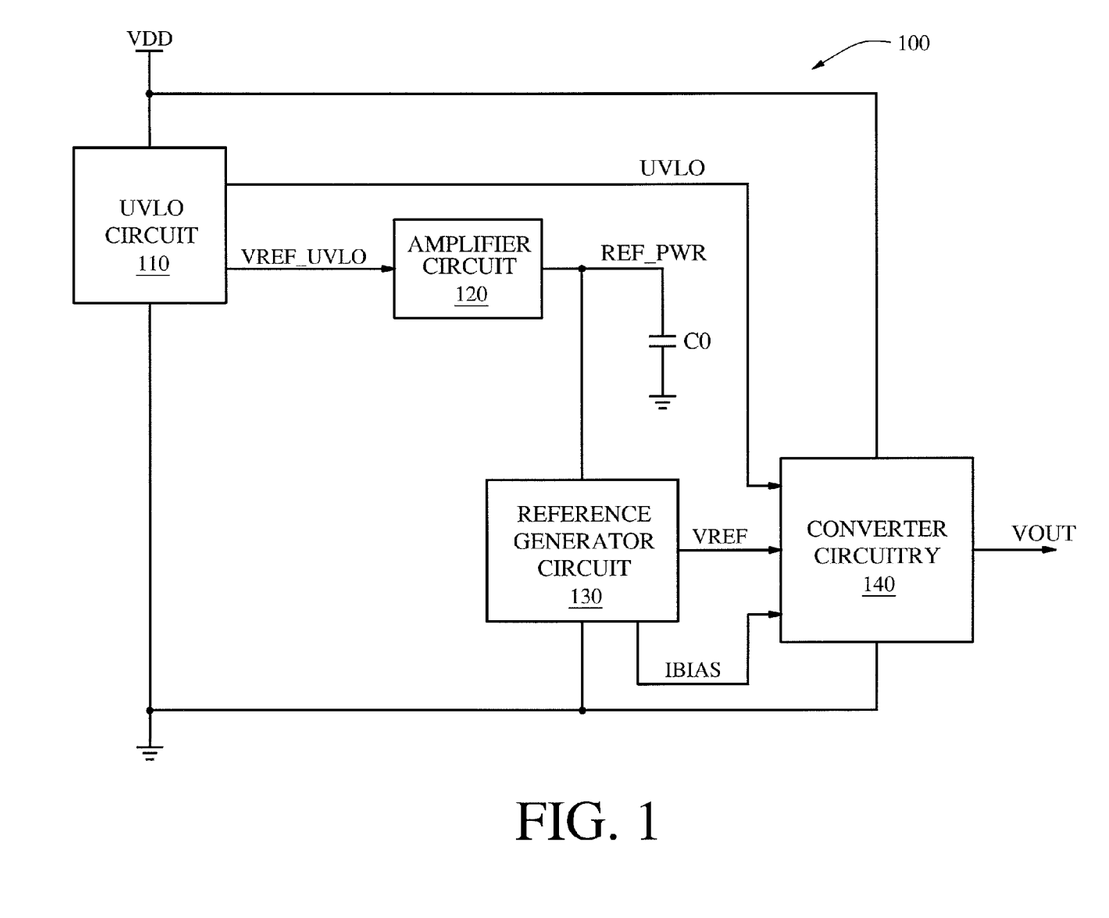
FIG. 1 is a block diagram of an embodiment of a regulator according to aspects of the present invention.

FIG. 1 is a block diagram of an embodiment of regulator 100. Regulator 100 includes UVLO circuit 110, amplifier circuit 120, capacitor C0, reference generator circuit 130, and converter circuitry 140.

Regulator 100 is arranged to provide regulated power signal VOUT from input power signal VDD such that regulated power signal VOUT is maintained at a substantially constant voltage over a range of voltages on input power signal VDD. For example, regulator 100 may be arranged to regulate regulated power signal VOUT to +12 volts, +3.3 volts, +1.8 volts, −5 volts, and/or the like. In addition, regulator 100 is arranged as an improved PSRR regulation circuit. In particular, the PSRR of regulator 100 is improved by powering reference generator circuit 130 from a reference power signal.

As illustrated, regulator 100 is coupled between positive input power supply signal VDD and ground. However, in other embodiments, regulator 100 may be coupled between a positive input power supply and a negative input power supply, between ground and a negative power supply, between two positive power supplies, and/or the like.

UVLO circuit 110 is arranged to provide status signal UVLO to converter circuitry 140. UVLO circuit 110 is further arranged to provide reference signal VREF_UVLO to amplifier circuit 120.

Status signal UVLO is provided to indicate a condition on input power signal VDD. Status signal UVLO may be employed, for example, as a power on reset signal, as an enable signal, as a shutdown signal, and/or the like. In one embodiment, status signal UVLO may be asserted (driven high) to indicate that the voltage of input power signal VDD is above a threshold voltage, is substantially stable, and/or the like. Likewise, status signal UVLO may be deasserted to indicate that the voltage of input power signal VDD is at or below a threshold voltage, is not substantially stable, and/or the like. In other embodiments, the polarity of status signal UVLO may be reversed, status signal UVLO may be employed to indicate other operating conditions, and/or the like.

UVLO circuit 110 is further arranged to provide a substantially constant voltage on reference signal VREF_UVLO. In one embodiment, UVLO circuit 110 includes a Brokaw band-gap reference circuit. In other embodiments, other band-gap circuits, linear regulators, Zener diodes, gas-filled tubes, digital-to-analog converters, and/or the like, may be suitably employed in UVLO circuit 110 instead of, or in conjunction with, a Brokaw band-gap circuit. In one embodiment, UVLO circuit 110 is arranged to provide status signal UVLO based on the voltage of reference signal VREF_UVLO relative to the voltage of input power signal VDD.

Amplifier circuit 120 is arranged to receive UVLO reference signal VREF_UVLO and to power reference generator circuit 130 via reference generator circuit power signal REF_PWR. In one embodiment, reference generator circuit power signal REF_PWR is provided by amplifying UVLO reference signal VREF_UVLO by a gain factor or by level shifting UVLO reference signal VREF_UVLO by an offset factor.

Capacitor C0 is arranged as a bypass capacitor to further smooth the power provided to reference generator 230. Capacitor C0 may be of any suitable type or value.

Reference generator circuit 130 is arranged to provide a substantially constant reference signal VREF. In one embodiment, reference generator circuit 130 includes a Brokaw band-gap reference circuit. In other embodiments, other band-gap circuits, linear regulators, Zener diodes, gas-filled tubes, digital-to-analog converters, and/or the like, may be suitably employed in reference generator circuit 130 instead of, or in conjunction with, a Brokaw band-gap circuit.

Converter circuitry 140 is arranged to receive input power signal VDD, reference voltage VREF, central bias current IBIAS, and status signal UVLO. Converter circuitry 140 is further arranged to provide regulated power signal VOUT from input power signal VDD based, at least in part, on these received signals.

In one embodiment, converter circuitry 140 includes switching power regulation circuitry. In another embodiment, converter circuitry 140 includes linear power regulation circuitry. Also, some embodiments of converter circuitry 140 are arranged to be disabled until status signal UVLO is asserted. For example, status signal UVLO may be employed to delay the start-up of converter circuitry 140 until the voltage of input power signal VDD is at or above a threshold value. Likewise, status signal UVLO may be employed to shut-down converter circuitry 140 if input voltage VDD becomes unstable, an under-voltage condition is detected, and/or the like.

In another embodiment, converter circuitry 140 may be virtually any circuit that is arranged to receive either a reference voltage or a reference current.

The arrangement of reference generator circuit 130 to be powered from UVLO circuit 110 and amplifier circuit 120 enables reference signal VREF to be provided with relatively little noise. In one embodiment, the noise on the reference signal VREF is less than the noise that would be present if reference generator circuit 130 was directly powered from input power signal VDD. Likewise, the reduction of noise on reference signal VREF enables reduced noise and increased PSRR on regulated power signal VOUT.

In other embodiments, regulator 100 differs from the described embodiments. For example, converter circuitry 140 may be arranged to as a current regulator converter circuitry and/or reference generator circuit 130 may be arranged to provide a reference current signal. Likewise, regulator 100 may be arranged to receive an enable signal, mode control signal, and/or the like. These and other variations are within the spirit and scope of the invention.

Figure 2:
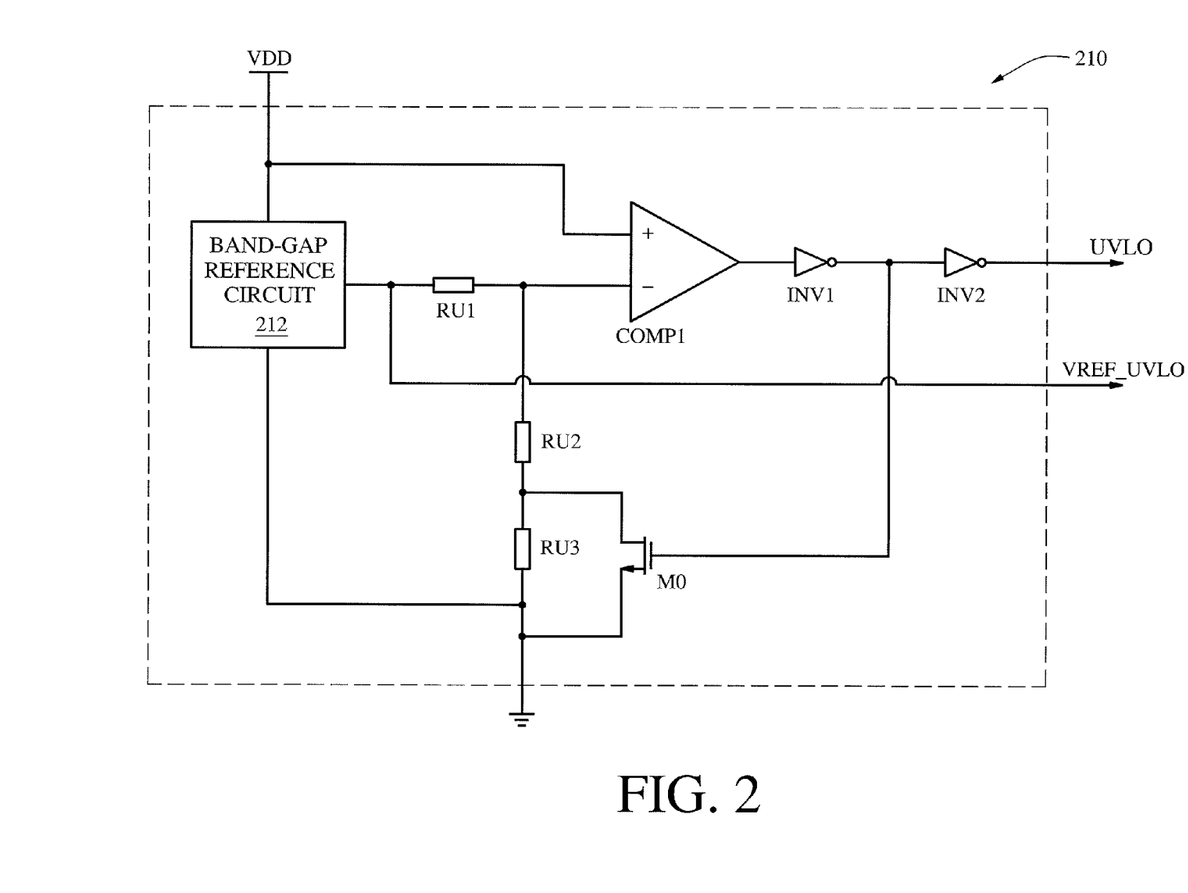
FIG. 2 is a schematic diagram of an embodiment of the UVLO circuit of FIG. 1 according to aspects of the present invention.

FIG. 2 is a schematic diagram of an embodiment of UVLO circuit 210. UVLO circuit 210 includes band-gap reference circuit 212, comparator COMP1, inverter INV1, inverter INV2, transistor M0, and resistors RU1-RU3. UVLO circuit 210 may be employed as an embodiment of UVLO circuit 110 of FIG. 1.

Although band-gap reference circuit 212 is depicted as a band-gap reference circuit, the invention is not limited in this manner. In other embodiments, linear regulators, Zener diodes, gas-filled tubes, digital-to-analog converters, and/or the like, may also be suitably employed in band-gap reference circuit 212.

Figure 3:
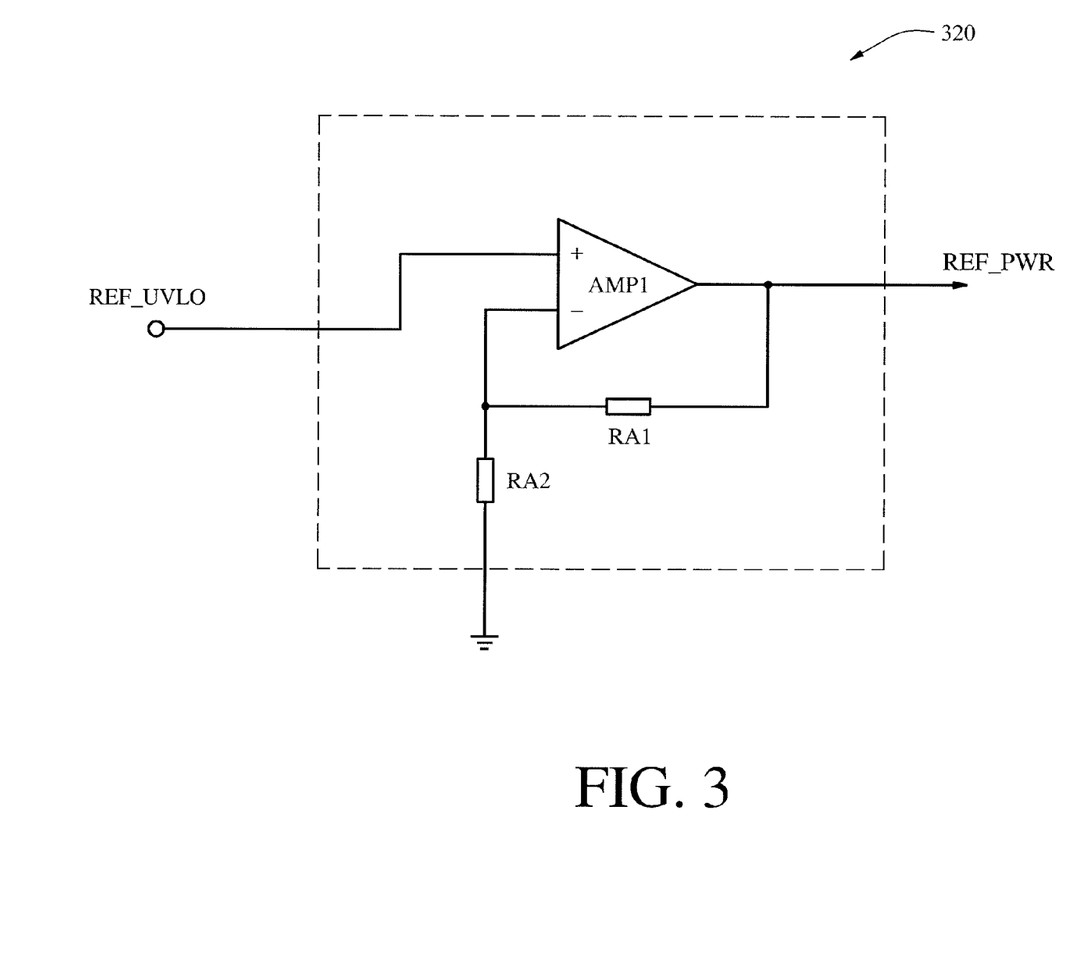
FIG. 3 is a schematic diagram of an embodiment of the amplifier circuit of FIG. 1 according to aspects of the present invention.

FIG. 3 is a schematic diagram of an embodiment of amplifier circuit 320. Amplifier circuit 320 includes amplifier AMP1, resistor RA1, and resistor RA2. Amplifier circuit 320 is arranged to amplify power signal REF_UVLO to provide reference generator circuit power signal REF_PWR. Amplifier circuit 320 may be employed as an embodiment of amplifier circuit 120 of FIG. 1.

Amplifier circuit 320 is arranged in a non-inverting amplifier configuration to amplify power signal REF_UVLO by a gain factor that is defined by the respective values of resistors RA1 and RA2. For example, amplifier circuit 320 may provide headroom and/or current drive capability to enable the powering of a reference generator circuit from a low voltage and/or low current power signal. In other embodiment, other amplifier circuits maybe employed to similarly increase voltage and/or current drive capability. For example, linear regulators, summing amplifiers, dc-offsetting amplifiers, and/or the like, may be suitably employed.

Figure 4:
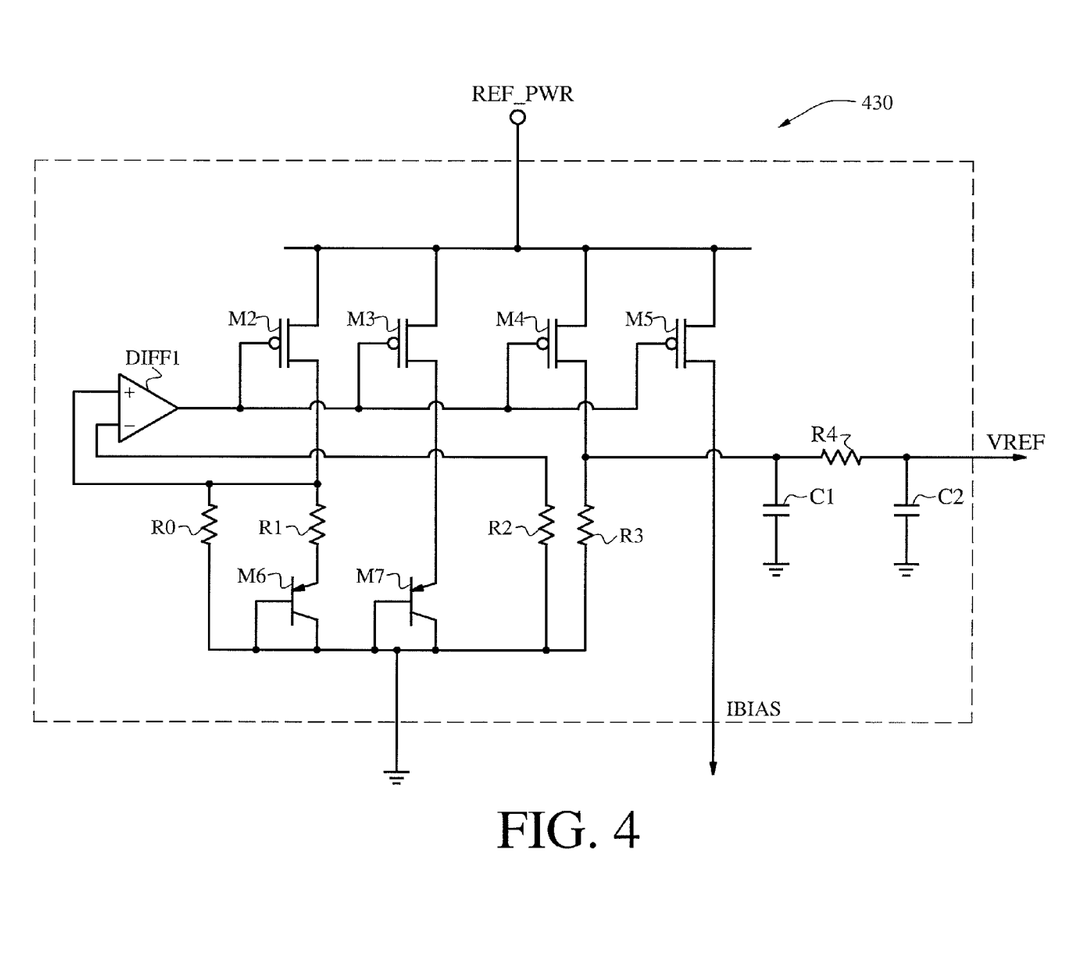
FIG. 4 is a schematic diagram of an embodiment of the reference generator circuit of FIG. 1 according to aspects of the present invention.

FIG. 4 is a schematic diagram of an embodiment of reference generator circuit 430. Reference generator circuit 430 includes differential amplifier DIFF1, transistors M2-M7, resistors R0-R4, and capacitors C1 and C2. Reference generator circuit 430 may be employed as an embodiment of reference generator circuit 130 of FIG. 1.

In one embodiment, reference generator circuit 430 is arranged as a band-gap reference circuit with an integrated RC π low-pass filter. Also, reference generator circuit 430 is further arranged to provide central bias current IBIAS. For example, central bias current IBIAS may be provided to one or more regulators and may be of any suitable value.

Figure 5:
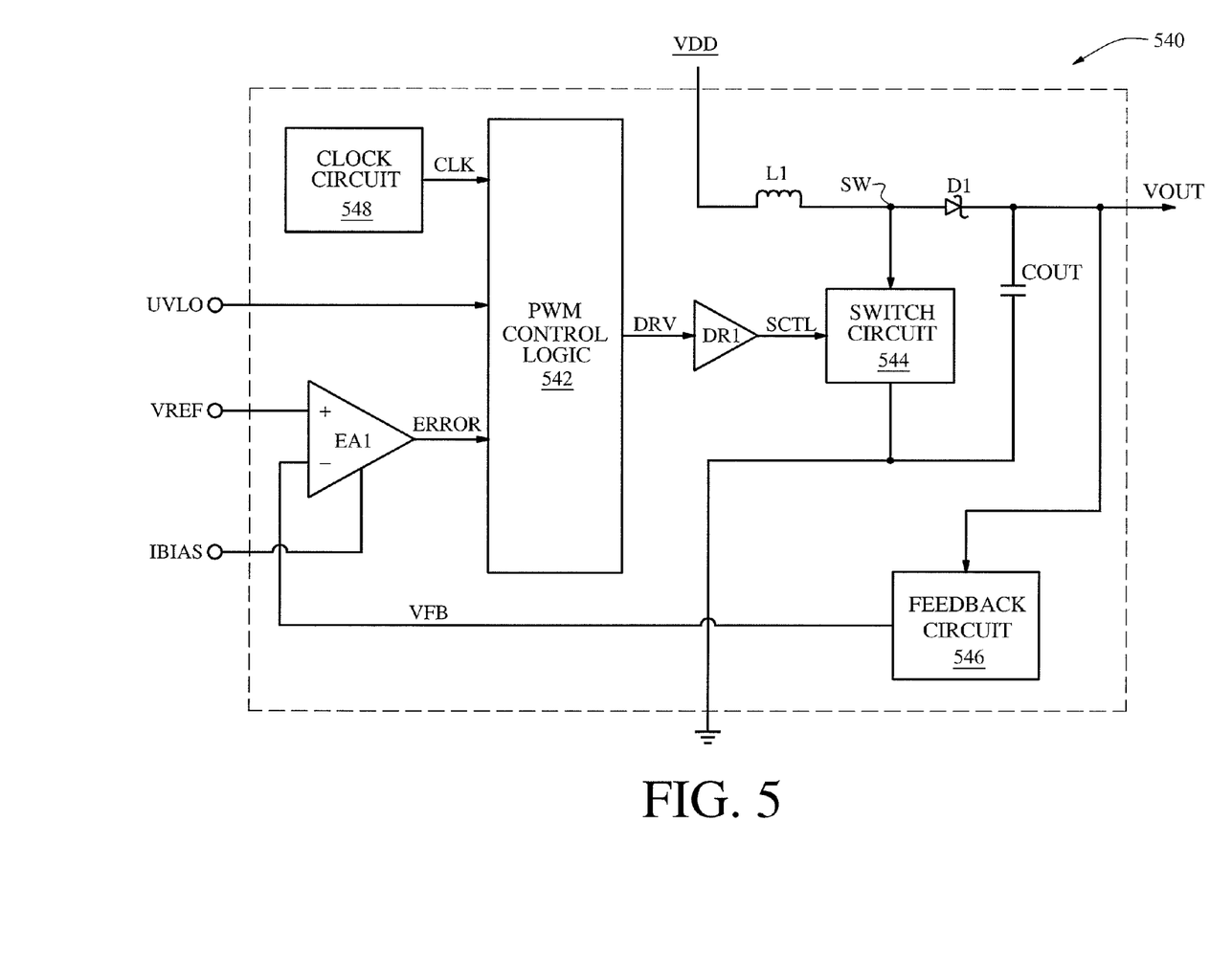
FIG. 5 is a block diagram of an embodiment of the converter circuitry of FIG. 1 according to aspects of the present invention.

FIG. 5 is a block diagram of an embodiment of converter circuitry 540. Converter circuitry 540 may include control logic circuit 542, switch circuit 544, feedback circuit 546, clock circuit 548, error amplifier EA1, driver DR1, inductor L1, diode D1, and capacitor COUT. Converter circuitry 540 may be employed as an embodiment of converter circuitry 140 of FIG. 1.

Converter circuitry 540 is arranged to receive input power signal VDD, reference voltage VREF, central bias current IBIAS, and status signal UVLO. Converter circuitry 540 is further arranged to provide regulated power signal VOUT from input power signal VDD based, at least in part, on these received signals.

In the illustrated embodiment, converter circuitry 540 is a portion of a PWM switching boost regulator. In other embodiments, converter circuitry 540 may be any converter circuitry that is suitable to provide power to the load. For instance, converter circuitry 540 may include buck regulation circuitry, buck-boost regulation circuitry, inverting regulation circuitry, fly-back conversion circuitry, switched capacitor conversion circuitry, and/or the like, and may include synchronous or asynchronous rectification circuitry. Further, converter circuitry 540 may include pulse width modulation (PWM), pulse frequency modulation (PFM), hysteretic, constant-on-time, and/or the like, regulation circuitry. In addition, converter circuitry 540 may also include linear, low dropout, and/or the like, regulation circuitry.

Error amplifier EA1 is arranged to provide error signal ERROR based, at least in part, on a difference between reference signal VREF and feedback signal VFB. Also, in one embodiment, bias current IBIAS is provided to error amplifier EA1 to bias the operation of error amplifier EA1. Although not shown, error amplifier EA1 may also include compensation circuitry.

In one embodiment, PWM control logic 542 is arranged to provide PWM modulation of driver input signal DRV to driver DR1 based, at least in part, on error signal ERROR and clock signal CLK. In one embodiment, PWM control logic 542 is further arranged to suppress and/or modify the output of switch control signal SCTL while status signal UVLO is asserted.

In one embodiment, driver circuit DR1 is provided to drive switch circuit 544 based on driver input signal DRV. However, in other embodiments, driver circuit DR1 may be omitted.

Switch circuit 544 is arranged to selectively couple input power signal VDD to switch node SW to provide regulated power signal VOUT based on switch control signal SCTL. In one embodiment, switch circuit 544 includes an N-channel MOSFET device. However, in other embodiments, switch circuit 544 may include a P-channel MOSFET device, a BJT transistor, a JFET transistor, and/or the like, instead of an N-channel MOSFET device.

Feedback circuit 546 is arranged to receive regulated power signal VOUT and to provide feedback signal VFB to error amplifier EA1. Feedback circuit 546 may include a voltage divider, a reference signal voltage divider, an amplifier circuit, and/or the like. Also, feedback circuit 546 may be designed to regulate the voltage of regulated power signal VOUT to any value.

Clock circuit 548 is arranged to provide clock signal CLK to control logic circuit 542. Clock circuit 548 may be either an internal clock generator or an external clock generator. Clock circuit 548 may provide a clock signal of any frequency and duty cycle that is suitable for use in performing switched mode power regulation. In one embodiment, clock signal CLK is a periodic saw-tooth waveform signal. In some embodiments, clock circuit 548 may be optional and/or omitted.

Inductor L1, diode D1, and capacitor COUT may be of any suitable types or values for use with power regulation.

In some embodiments, converter circuitry may differ from the described embodiment. For example, other converter circuitry may include other protection circuits such as over-voltage protection circuits, over-current protection circuits, under-current protection circuits, temperature protection circuits, battery status monitoring circuits, and/or the like. These and other variations are within the spirit and scope of the invention.

The above specification, examples and data provide a description of the method and applications, and use of the invention. Since many embodiments of the invention can be made without departing from the spirit and scope of the invention, this specification merely set forth some of the many possible embodiments for the invention.

What is claimed as new and desired to be protected by Letters Patent of the United States is:

1. A circuit for regulating power, comprising:
    a regulator controller that is arranged to perform steady-state regulation of an output power signal based, at least in part, on a reference signal, wherein the regulator controller includes:
        a under-voltage lock-out (UVLO) circuit that is arranged to monitor a status of an input power signal and to provide a status signal to indicate the status of the input power signal, wherein the regulator controller is arranged to be disabled while the status signal is deasserted, and wherein the UVLO circuit is further arranged to provide a UVLO reference power signal;
        an amplifier circuit that is arranged to receive the UVLO reference power signal and to provide a reference generator power signal; and
        a reference generator that is arranged to provide the reference signal such that the reference signal is maintained at a substantially constant value, wherein the reference generator is arranged to be powered from the reference generator power signal, and wherein the reference generator circuit includes at least one of a band-gap reference circuit, a Zener diode, a gas filled tube, or a digital-to-analog converter.

2. The circuit of claim 1, wherein the regulator controller is a low drop out (LDO) linear voltage regulator controller.

3. The circuit of claim 1, wherein the regulator controller is a switched mode regulator controller.

4. The circuit of claim 1, wherein the amplifier circuit includes:
    an operational amplifier circuit that is arranged in a non-inverting amplifier configuration.

5. The circuit of claim 1, wherein the UVLO circuit includes:
    a band-gap reference circuit that is arranged to provide the UVLO reference power signal; and
    a comparison circuit that is arranged to compare the input power signal with the UVLO reference power signal.

6. The circuit of claim 1, wherein the UVLO circuit, the amplifier circuit, and the reference generator circuit enable reduced reference signal noise.

7. The circuit of claim 1, wherein the UVLO circuit, the amplifier circuit, and the reference generator circuit enable an improved power supply rejection ratio (PSRR).

8. The circuit of claim 1, wherein the reference generator circuit includes:
    a Brokaw band-gap reference circuit that is arranged to provide an unfiltered reference signal; and
    a low pass filter circuit that is arranged to receive the unfiltered reference signal, to low-pass filter the unfiltered reference signal, and to provide the reference signal.

9. The circuit of claim 1, wherein the reference generator circuit is further arranged to provide a bias current.

10. A circuit for providing a reference signal, comprising:
    an under-voltage lock-out (UVLO) circuit that is arranged to receive an input power signal, to provide a status signal, and to provide a UVLO reference power signal; and is further arranged such that the status signal indicates a status of the input power signal, and such that the UVLO reference power signal has a substantially stable voltage;
    an amplifier circuit that is arranged to receive the UVLO reference power signal and to provide a reference generator power signal such that the reference generator power signal is based, at least in part, on the UVLO reference power signal and on a gain factor; and a reference generator that is arranged to provide a reference signal such that the reference signal is maintained at a substantially constant value, wherein the reference generator is arranged to be powered from the reference generator power signal, and wherein the reference generator circuit includes at least one of a band-gap reference circuit, a Zener diode, a gas filled tube, or a digital-to-analog converter.

11. The circuit of claim 10, wherein the amplifier circuit includes:
an operational amplifier circuit that is arranged in a non-inverting amplifier configuration.

12. The circuit of claim 10, wherein the UVLO circuit, the amplifier circuit, and the reference generator circuit enable reduced reference signal noise.

13. The circuit of claim 10, wherein the reference generator circuit includes:
a Brokaw band-gap reference circuit that is arranged to provide an unfiltered reference signal; and
a low pass filter circuit that is arranged to receive the unfiltered reference signal, to low-pass filter the unfiltered reference signal, and to provide the reference signal.

14. A method for regulating power, comprising:
receiving an input power signal;
employing an under-voltage lock-out (UVLO) circuit to provide a status signal such that the status signal indicates a status of the input power signal;
employing the UVLO circuit to provide a UVLO reference signal, wherein the UVLO reference signal is maintained at a substantially constant value, and wherein a first noise value is associated with the UVLO reference signal;
amplifying the UVLO reference signal to provide a reference generator power signal;
employing the reference generator power signal to power a reference generator circuit; and
employing the reference generator circuit to provide a reference signal, wherein the reference signal is maintained at a substantially constant value, wherein a second noise value is associated with the reference signal, wherein the second noise value is lower than the first noise value, and wherein the reference generator circuit includes at least one of a band-gap reference circuit, a Zener diode, a gas filled tube, or a digital-to-analog converter.

15. The method of claim 14, further comprising:
employing the reference generator circuit to provide a bias current.

16. The method of claim 14, wherein reduced reference signal noise and improved power supply rejection ratio (PSRR) are enabled.

* * * * *

UNITED STATES PATENT AND TRADEMARK OFFICE
CERTIFICATE OF CORRECTION

| | | |
|---|---|---|
| PATENT NO. | : 8,102,168 B1 | Page 1 of 1 |
| APPLICATION NO. | : 11/871536 | |
| DATED | : October 18, 2011 | |
| INVENTOR(S) | : Kern Wai Wong | |

It is certified that error appears in the above-identified patent and that said Letters Patent is hereby corrected as shown below:

On the title page, item (56), under (Other Publications), in column 1, line 4, delete "Hish" and insert -- High --, therefor.

In column 6, line 8, in Claim 1, before "under-voltage" delete "a" and insert -- an --, therefor.

Signed and Sealed this
Third Day of July, 2012

David J. Kappos
*Director of the United States Patent and Trademark Office*